United States Patent [19]
Gondeck

[11] Patent Number: 5,802,917
[45] Date of Patent: Sep. 8, 1998

[54] GEAR SHIFTING MECHANISM FOR CHANGE-SPEED GEARBOXES OF MOTOR VEHICLES

[75] Inventor: Hans-Ulrich Gondeck, Pulheim-Stommeln, Germany

[73] Assignee: Ford Global Technologies, Inc., Dearborn, Mich.

[21] Appl. No.: 733,651

[22] Filed: Oct. 17, 1996

[30] Foreign Application Priority Data

Oct. 25, 1995 [DE] Germany ............... 195 39 599.9

[51] Int. Cl.⁶ .................. F16H 63/36; B60K 41/26
[52] U.S. Cl. .................. 74/411.5; 74/473.24; 192/4 C
[58] Field of Search .................. 74/411.5, 477, 74/473.24; 192/4 C

[56] References Cited

U.S. PATENT DOCUMENTS

| | | | |
|---|---|---|---|
| 4,430,904 | 2/1984 | Fogelberg | 74/411.5 |
| 4,472,868 | 9/1984 | Takahashi | 74/477 X |
| 4,510,819 | 4/1985 | Inui | 74/411.5 X |
| 4,601,214 | 7/1986 | Fukuchi | 74/411.5 X |
| 4,817,468 | 4/1989 | Leigh-Monstevens et al. | 74/335 |
| 4,821,590 | 4/1989 | Tury et al. | 74/335 |
| 5,036,721 | 8/1991 | Gugin | 74/476 |
| 5,099,711 | 3/1992 | Langbo et al. | 74/336 R |
| 5,136,897 | 8/1992 | Boardman | 74/866 |
| 5,274,553 | 12/1993 | Boardman | 74/866 X |
| 5,331,863 | 7/1994 | Kobayashi et al. | 74/476 |
| 5,454,764 | 10/1995 | Koenig et al. | 475/131 |
| 5,515,742 | 5/1996 | Ibushuki | 74/411.5 |
| 5,582,071 | 12/1996 | Fujii | 74/411.5 |

FOREIGN PATENT DOCUMENTS

| | | |
|---|---|---|
| 2319396 | 5/1975 | Germany . |
| 2319397 | 7/1975 | Germany . |
| 3147782 | 8/1984 | Germany . |

*Primary Examiner*—Alan D. Herrmann

[57] ABSTRACT

A gear shifting mechanism and method are provided for change-speed gearboxes of motor vehicles with braking of an input shaft of the gearbox during engagement of reverse gear. The gearbox includes a gearbox housing, a shifter shaft radially pivotably and axially slidably supported by the housing. A plurality of shifter forks are supported by the shifter shaft. A reverse fork includes an arm having a groove. A shifter rod is supported by the housing adjacent the shifter shaft. A shifter finger is supported by the shifter rod. The finger is engageable in the groove of the arm to selectively move the reverse fork. A shift interlock is substantially axially fixed to the housing. The interlock includes a blocking plate rotatable with the shift finger to selectively block movement of a shifter fork. An interlock connector releasably connects the shift interlock for axial movement with the shifter finger or the shifter shaft to axially move the forward shifter fork during engagement of reverse gear.

7 Claims, 4 Drawing Sheets

GEAR SHIFTING MECHANISM FOR CHANGE-SPEED GEARBOXES OF MOTOR VEHICLES

BACKGROUND OF THE INVENTION

1. Field of the Invention

The invention relates to a gear shifting mechanism for change-speed gearboxes of motor vehicles with braking of the input shaft during engagement of the reverse gear.

2. Description of the Prior Art

From German Auslegeschrift 23 19 396, German patent 23 19 397 and German patent 31 47 782 gear shifting mechanisms for change-speed gearboxes of motor vehicles with braking of the input shaft during engagement of the reverse gear are known in which, during a preselection movement in the shifting lane of the reverse gear, a synchronizer of a forward gear is momentarily actuated by means of parts of the shift interlock in order to bring about braking of the input shaft through synchronization.

German Auslegeschrift 23 19 396 discloses a gear shifting mechanism in which a cam surface is provided on a part of the shift interlock which serves to bring about a momentary application of the synchronizer of a forward gear during the preselection movement.

German patent 23 19 397 discloses a gear shifting mechanism in which a pin fitted on the shifter shaft acts on a control edge of a shifter fork of a forward gear during a preselection movement in the shifting lane of the reverse gear in order to displace this shifter fork, uncoupled from its shifter arm by way of a resilient connection, for a short time, and to actuate the synchronizer of a forward gear in order to brake the input shaft.

From German patent 31 47 782 a further gear shifting mechanism is known in which again a shifter fork is uncoupled from its shifter arm by means of a resilient connection and in which means are provided to effect the momentary application of the synchronizer of a forward gear without interlocking problems.

In all three of the known gear shifting mechanisms, the radially pivotable and axially fixed shift interlock remains in its intended position in the gearbox housing. The known gear shifting mechanisms in the form of the cam surfaces and in the form of the resilient connections between a shifter fork and its shifter arm have the disadvantage that they are particularly susceptible to manufacturing tolerances, and that by means of the preselection movement and a synchronizer the necessary braking of the input shaft cannot be achieved in the desired short period of time.

SUMMARY OF THE INVENTION

It is an object of the invention to provide a gear shifting mechanism for motor vehicle change-speed gearboxes with braking of the input shaft during engagement of the reverse gear having a radially pivotable and substantially axially fixed shift interlock such that a momentary actuation of the synchronizers of forward gears is not already effected during the preselection movement in the shifting gate of the reverse gear, but only during an initial engagement movement of the reverse gear, wherein through the momentary actuation of several synchronizers of forward gears the necessary braking of the input shaft can take place in a desired short period of time.

To this end, a gear shifting mechanism is provided for change-speed gearboxes of motor vehicles with braking of an input shaft of the gearbox during engagement of the reverse gear. The gearbox includes a gearbox housing, a shifter shaft radially pivotably and axially slidably supported by the housing. A plurality of shifter forks are supported by the shifter shaft. A reverse fork includes an arm having a groove. A shifter rod is supported by the housing adjacent the shifter shaft. A shifter finger is supported by the shifter rod. The finger is engageable in the groove of the arm to selectively move the reverse fork. A shift interlock is substantially axially fixed to the housing. The interlock includes a blocking plate rotatable with the shift finger to selectively block movement of a shifter fork. An interlock connector releasably connects the shift interlock for axial movement with the shifter finger or the shifter shaft to axially move the forward shifter fork during engagement of reverse gear.

BRIEF DESCRIPTION OF THE DRAWINGS

The invention will now be described in more detail, by way of example, with reference to an embodiment shown in the accompanying drawings, in which.

DETAILED DESCRIPTION OF A PREFERRED EMBODIMENT

Figure 1:
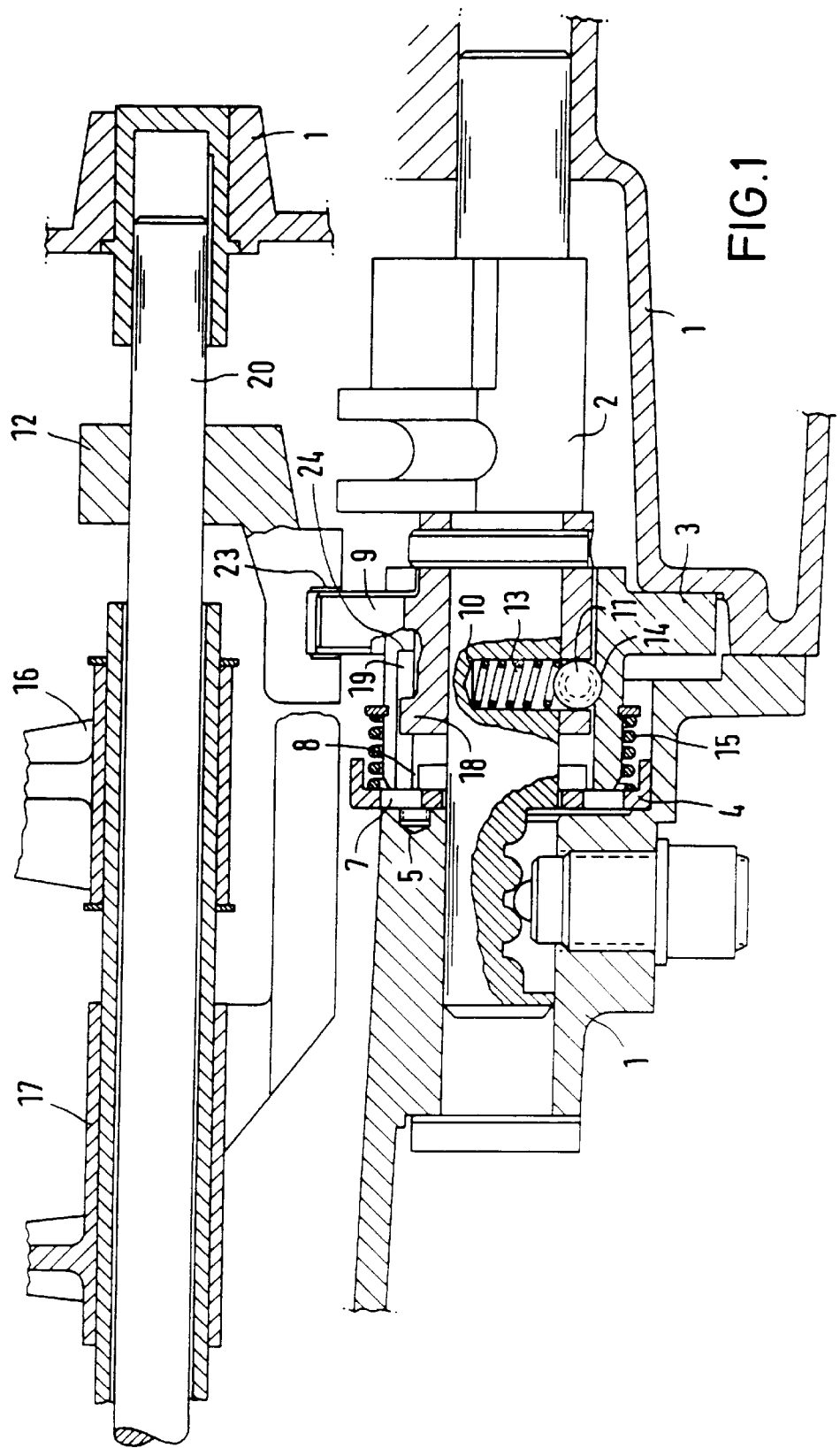
FIG. 1 is a vertical section through a change-speed gearbox of a motor vehicle having a gear shifting mechanism in accordance with the invention in the neutral position.

In the exemplary embodiment shown in the drawings, a gearbox housing 1 has fitted in it a shifter shaft 2 which can actuate all the shifter forks. Such so-called single-rod shifts are familiar as such to those skilled in the art, but it is pointed out that the invention can be applied not only to single-rod shifts but also to gear shifting mechanisms with more than one shifter rod.

The shifter shaft 2, which is radially pivotable and axially slidable in the gearbox housing 1, carries a shift interlock 3 which is known per se and follows a shifter finger 9 fitted on the shifter shaft 2 during its radial pivoting movement, but is substantially fixed axially as described below. The interlock 3 follows the shifter finger in its radially pivoting preselection movement in order to block the nonselected shifter forks.

A key plate 4 is arranged concentrically with the shifter shaft 2 and is held nonrotatably in position in the gearbox housing 1 by a pin-and-hole connection 5. The key plate 4 is provided with a plurality of recesses 7 which coincide with a plurality of lands 8 which are arranged extending axially on the sleeve part 30 of the shift interlock 3 when reverse is selected. In the shifting plane 6, the recesses 7 in the key plate 4 are aligned with the axially projecting land 8 of the shift interlock 3. The shifter finger 9 can form part of the shifter shaft 2, or as shown, be in the form of a part fixed on the shifter shaft 2. The shifter finger 9 selectively engages a groove in the shifter arm of the shifter forks 12, 16, and 17.

Extending through a sleeve part 31 of the shifter finger 9 and into the shifter shaft 2 is a bore 10 in which is disposed a spring 13 which loads a ball 11 which cooperates with a ball notch 14 on the internal circumference of the sleeve part 30 of the shift interlock 3. According to the invention, the shift interlock 3 is fitted in the gearbox housing 1 so as to be capable of restricted axial movement, and is held in neutral position (to the right as seen in FIG. 1), by a spring 15 which is supported on the one side on the key plate 4 and on the other side on the sleeve part 30 of the blocking plate 29 of the shift interlock 3, up against one side of its seat in the gearbox housing 1.

Figure 2:
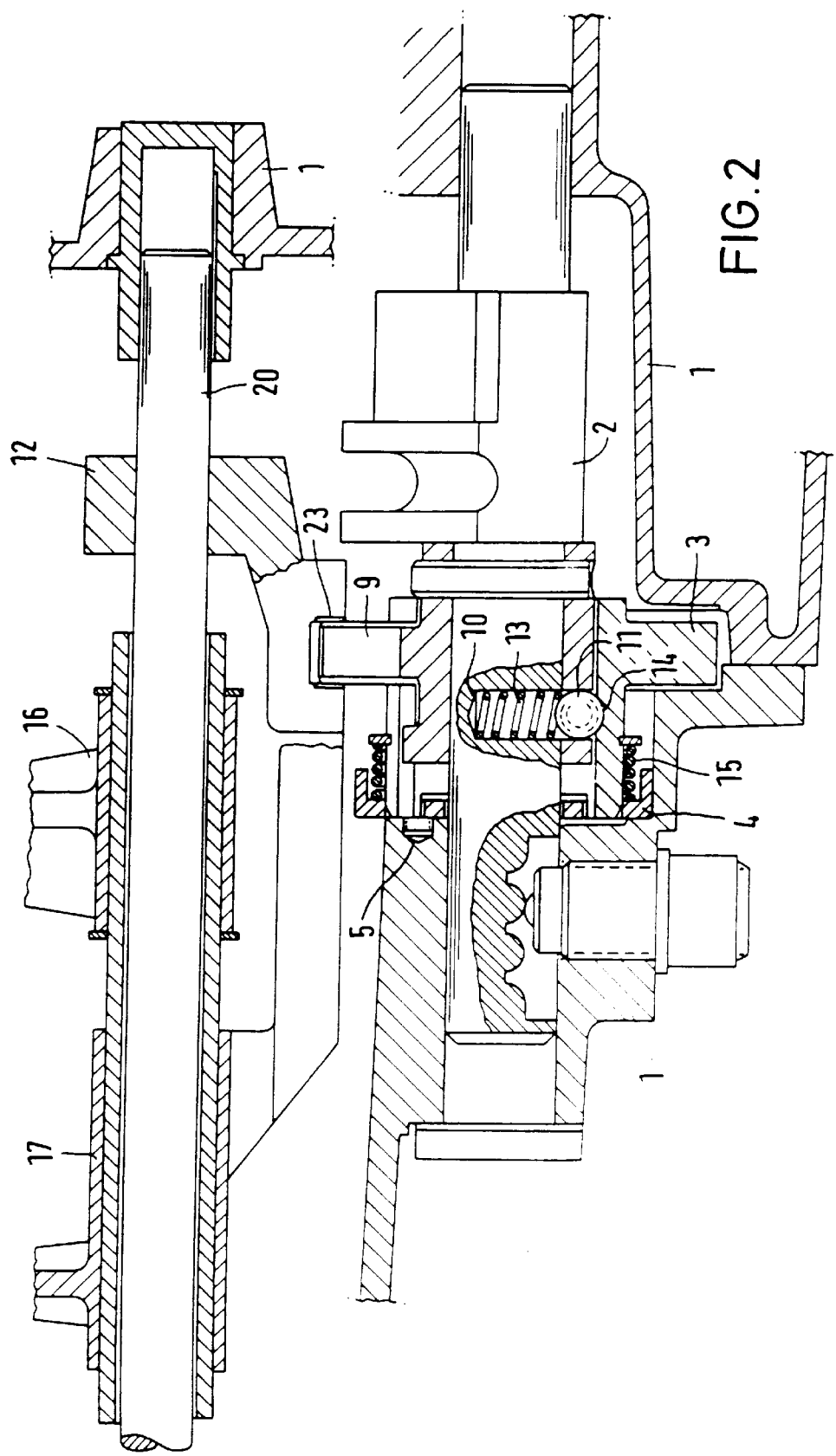
FIG. 2 is a vertical section as in FIG. 1, but with the gear shifting mechanism in the braking position.
Figure 3:
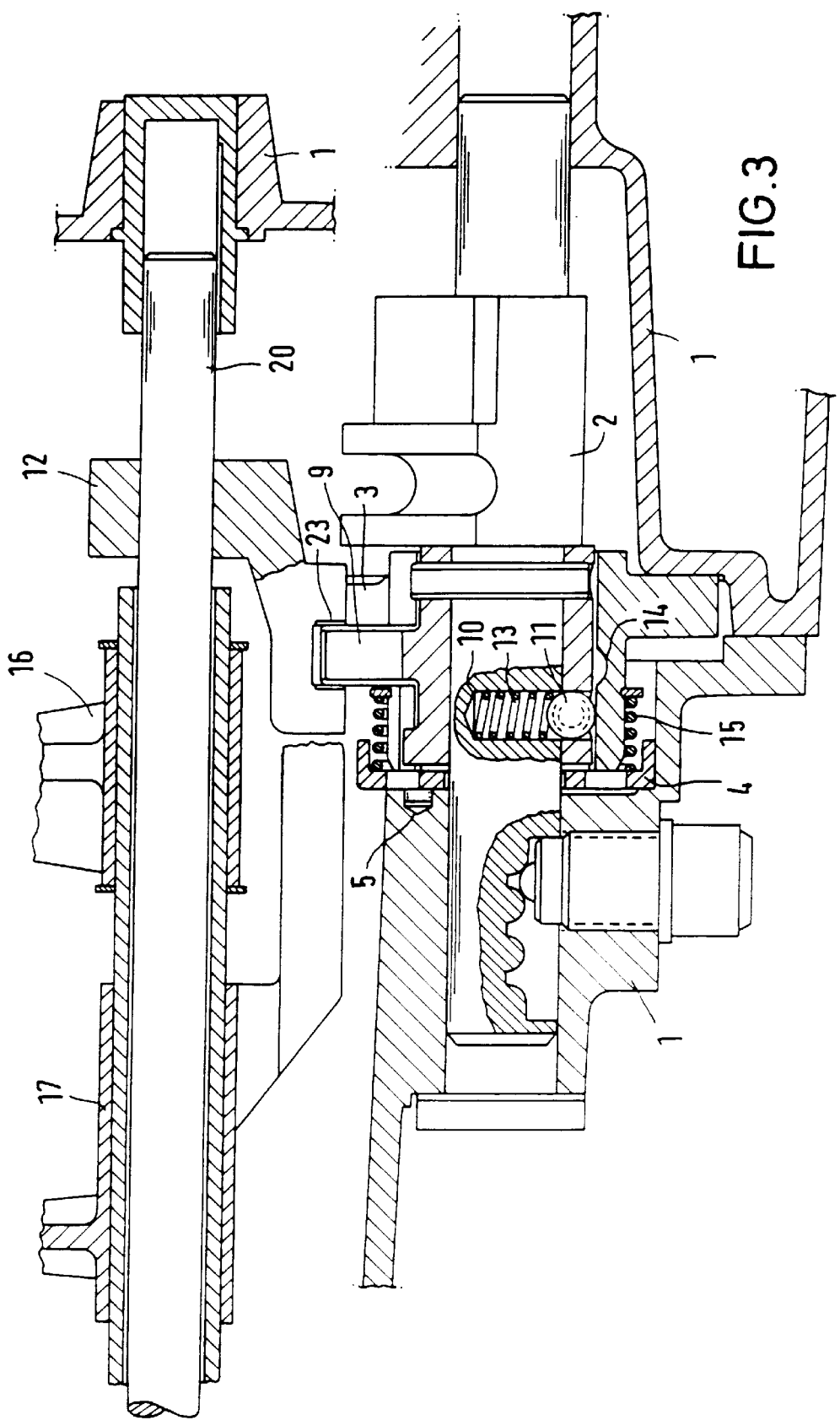
FIG. 3 is a vertical section as in FIG. 1 with reverse gear engaged.

If the shifter shaft 2 is moved to the left out of its neutral position shown in FIG. 1 in the direction of engagement of the reverse gear, then, as shown in FIG. 2, the nonpositive connection of the spring-loaded ball catch 13/11–14 carries the shift interlock 3 with the shaft 2 or finger 9 to the left (as seen in FIG. 2) and the axially projecting lands 8 enter the recesses 7 in the key plate 4. A reverse shifter fork or carrier 12 is moved by a finger 9 carried by the shifter shaft 2, which engages a groove 28 in the reverse fork 12, to slide a loose reverse gear wheel (not shown) into engagement with associated gear wheels (not shown). During this movement of the reverse fork 12, the blocking plate 29 of the shift interlock 3, together with the shifter finger 9, is moved to the left along with the shifter shaft 2, and the shifter arms 25, 26 of the shifter forks 16 and 17 for the forward gears of the 2nd and 4th gears are thereby carried along by the blocking plate 29 for a precise limited extent and thereby synchronized. The synchronization effects braking of the input shaft during engagement of the reverse gear. After synchronization has taken place, the lands 8 of the shift interlock 3 run up against a stop on the housing 1 and break the connecting force of the spring-loaded ball catch 13/11–14 to the shift interlock 3 so the interlock 3 is returned by the spring 15 to its starting position.

The braking of the input shaft of the change-speed gearbox is thus initiated during selection of reverse gear by synchronization of the forward gears, here the second and fourth gears, and owing to the fact that in this case two synchronizers are operated, the braking can take place in the desired short period of time.

The possible extent of the working path for the braking is determined by the depth of the recesses 7 in the key plate 4, in which the lands 8 of the shift interlock 3 penetrate. As soon as the axial lands 8 meet the gearbox housing 1 lying behind the recesses 7, the resistance to an axial movement of the shifter shaft 2 increases sharply and the nonpositive connection in the form of the spring-loaded ball catch 13/11–14 is broken and the axial carrying force acting in the reverse gear direction falls sharply. The shift interlock 3 and the shifter forks 16 and 17 for the two forward gears which cooperate therewith are thereby driven back into their neutral starting positions by the force of the spring 15. The input shaft is again free to rotate.

With a further axial movement of the shifter shaft 2, the sliding gear wheel of the reverse gear is displaced by the shifter finger 9 via the shifter arm 23 and the carrier or reverse shifter fork 12, and in this case via a shifter rod 20, and the sliding gear wheel of the reverse gear can be quietly slid into mesh.

If there is a forward gear, e.g., a fifth gear, in the shifting lane of the reverse gear, a possible axial movement of the shift interlock 3 during engagement of the forward gear, here the fifth gear, can be prevented if a cam 18 on the sleeve part 31 of the shifter finger 9 engages into a groove 19 in the sleeve part 30 of the shift interlock 3 and presses against a stop 24 at the end of the groove. The reverse gear is thus blocked and an uncontrolled synchronization of other gears is reliably prevented.

Figure 4:
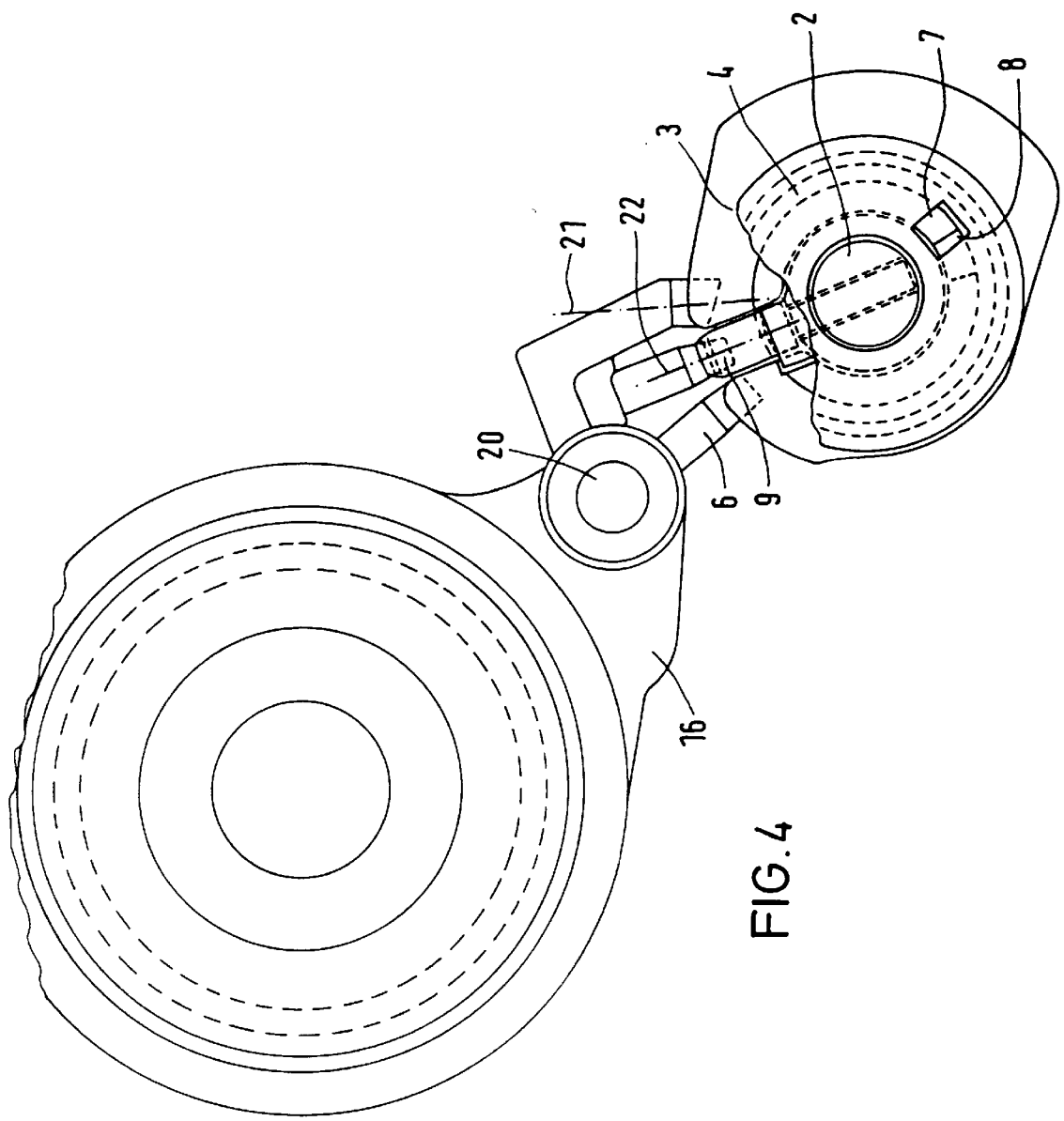
FIG. 4 is a section perpendicular to the shifting shaft, showing parts of the shift interlock of the gear shifting mechanism.

As can be seen from FIG. 4, in the shifting lane or shifting plane 21 of the first and second gears and in the shifting plane 22 of the third and fourth gears, the plurality of axially projecting lands 8 of the shift interlock 3 are disposed beside the recesses 7 in the key plate 4, and the locking plate of the shift interlock 3 is therefore held axially fixed in its neutral position in the gearbox housing 1 by the abutment of the lands 8 against the key plate 4, thereby reliably maintaining the function of the shift interlock in preventing a double shift.

While certain embodiments of the present invention have been described in detail, those familiar with the art to which this invention relates will recognize various alternative designs and embodiments for practicing the invention as defined by the following claims.

I claim:

1. A gear shifting mechanism for change-speed gearboxes of motor vehicles with braking of an input shaft of the gearbox during engagement of a reverse gear, comprising:

a gearbox housing;

a shifter shaft radially pivotably and axially slidably supported by said housing;

a plurality of shifter forks supported by said shifter shaft, said forks including a reverse shifter fork having an arm with a groove formed therein and a forward shifter fork;

a shifter rod supported by said housing adjacent said shifter shaft;

a shifter finger supported by said shifter rod, said finger engageable in said groove of said arm to selectively move said reverse fork axially;

a shift interlock substantially axially fixed to said housing, said shift interlock including a blocking plate rotatable with said shift finger to selectively block movement of at least one of said shifter forks; and interlock connection means for releasably connecting said shift interlock for axial movement with one of the group comprising said shifter finger and said shifter shaft to axially move said forward shifter fork with said shift interlock during engagement of reverse gear.

2. A gear shifting mechanism according to claim 1, wherein the interlock connection means comprises:

one of the group comprising said shifter finger and said shifter shaft having a bore provided therein;

a ball provided in said bore adjacent said shift interlock; and a spring interposed between said ball and the bottom of said bore for urging said ball out of said bore into contact with said shift interlock.

3. A gear shifting mechanism according to claim 2, wherein the shift interlock further comprises a neutral positioning means, said neutral positioning means including:

a key plate supported nonrotatably by the housing, said key plate having a plurality of recesses;

a spring interposed between said shift interlock and said key plate for urging said shift interlock away from said key plate; and said shift interlock having a sleeve portion with a plurality of axially projecting lands aligned with the recesses in the key plate when reverse is preselected to permit axial movement of said shift interlock.

4. A gear shifting mechanism according to claim 3, said shift interlock further comprising:

said gearbox having a shift plane for selecting reverse gear and a forward gear;

said shift interlock sleeve portion having an axial groove provided therein and a stop at one end of said groove; and said shifter finger including a second sleeve portion having a cam, said cam projecting into said shift interlock sleeve groove and cooperating with said stop to block movement of said reverse fork when said finger is moved in said shift plane to move said forward fork.

5. A method of braking an input shaft of a motor vehicle gearbox having a plurality of shift forks, a shifter shaft and a shift interlock with a blocking plate during engagement of a reverse gear, the braking method comprising:

releasably connecting the shift interlock to the shifter shaft;

rotatably aligning a land on the shift interlock to a recess in the key plate;

axially moving a forward shift fork with the blocking plate to synchronize a forward gear; and disconnecting the blocking plate from axial movement with the shifter shaft to release the forward synchronizer from engagement.

6. A method of braking an input shaft according to claim 5, further comprising resiliently connecting the shifter shaft and shift interlock with a ball-and-spring catch.

7. A method of braking an input shaft according to claim 6, wherein disconnecting said blocking plate comprises:

compressing a compression spring between said shift interlock and a housing of said gearbox;

disconnecting said shift interlock from the ball-and-spring catch; and positioning said shift interlock to a neutral position with said compression spring.

\* \* \* \* \*